(12) United States Patent
Khan et al.

(10) Patent No.: US 9,229,853 B2
(45) Date of Patent: Jan. 5, 2016

(54) METHOD AND SYSTEM FOR DATA DE-DUPLICATION

(75) Inventors: Jawad B. Khan, Cornelius, OR (US);
Ningde Xie, Hillsboro, OR (US); Raj K. Ramanujan, Federal Way, WA (US);
Leena K. Puthiyedath, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 204 days.

(21) Appl. No.: 13/977,069

(22) PCT Filed: Dec. 20, 2011

(86) PCT No.: PCT/US2011/066156
§ 371 (c)(1),
(2), (4) Date: Jun. 28, 2013

(87) PCT Pub. No.: WO2013/095381
PCT Pub. Date: Jun. 27, 2013

(65) Prior Publication Data
US 2013/0318288 A1    Nov. 28, 2013

(51) Int. Cl.
*G06F 13/12*     (2006.01)
*G06F 7/00*      (2006.01)
*G06F 12/02*     (2006.01)
*G06F 3/06*      (2006.01)
*G06F 12/08*     (2006.01)

(52) U.S. Cl.
CPC .......... *G06F 12/0246* (2013.01); *G06F 3/0608* (2013.01); *G06F 3/0641* (2013.01); *G06F 3/0679* (2013.01); *G06F 12/0802* (2013.01); *G06F 2212/304* (2013.01)

(58) Field of Classification Search
None
See application file for complete search history.

(56) References Cited

U.S. PATENT DOCUMENTS

| | | | | |
|---|---|---|---|---|
| 8,195,878 | B2* | 6/2012 | Mittendorff et al. | 711/118 |
| 8,204,867 | B2* | 6/2012 | Benhase et al. | 707/692 |
| 8,332,616 | B2* | 12/2012 | Saliba | G06F 3/0608 711/154 |
| 8,392,791 | B2* | 3/2013 | Saliba | G06F 3/0608 707/692 |
| 2008/0034267 | A1 | 2/2008 | Saliba et al. | |
| 2008/0155192 | A1 | 6/2008 | Iitsuka | |
| 2010/0037118 | A1 | 2/2010 | Saliba et al. | |
| 2011/0029497 | A1 | 2/2011 | Benhase et al. | |
| 2011/0055471 | A1* | 3/2011 | Thatcher et al. | 711/114 |

OTHER PUBLICATIONS

International Search Report and Written Opinion, Mailed Date: Sep. 28, 2012, Application No. PCT/US2011/066156, Filed Date: Dec. 20, 2011, pp. 10.

* cited by examiner

*Primary Examiner* — Farley Abad
*Assistant Examiner* — Richard B Franklin
(74) *Attorney, Agent, or Firm* — Kacvinsky Daisak Bluni PLLC

(57) ABSTRACT

An apparatus may comprise a non-volatile random access memory to store data and a processor coupled to the non-volatile random access memory. The apparatus may further include a data de-duplication module operable on the processor to read a signature of incoming data, compare the signature to first data in the non-volatile random access memory, and flag the incoming data for discard when the signature indicates a match to the first data. Other embodiments are disclosed and claimed.

22 Claims, 12 Drawing Sheets

METHOD AND SYSTEM FOR DATA DE-DUPLICATION

BACKGROUND

In the present day, data de-duplication processes are used to improve storage utilization by reducing the amount of data written to a drive, as well as to reduce the number of data bytes sent across a link during network data transfers.

In the de-duplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is a factor of the chunk size), the amount of data that must be stored or transferred can be greatly reduced.

Many advantages accrue to de-duplication of data in storage systems. In solid state storage systems, such as those that employ solid state NAND memory, it is well known that memory degradation occurs after a finite amount of write operations are performed on devices that constitute the NAND memory and other non-volatile memory technologies. Accordingly, the use of data de-duplication may improve the endurance of the memory because more unique data can be written during the lifetime of the NAND device due to the reduction in duplication. In addition, extra storage space may be created, which can be used in a solid state device as "shuffle space" for improving write input/output operations per second (IOPS). Furthermore, power consumption is reduced to the extent that the data de-duplication process reduces NAND write energy and device input/output power. Bus bandwidth and write speed to a solid state NAND memory are also improved because of the reduced amount of data to be written.

A conventional approach for data de-duplication involves the use of hash algorithms (HA), which produce hash digests, whose size is typically in the range of 32 Bytes or smaller. By comparing just the hash digests, the determination of whether one data block is identical to another can be performed quickly. However, a 32 Byte hash digest results in about 7% overhead for a typical memory block size of 512 Bytes.

In the realm of virtual machines (VM), applications and processes create copies of memory, which can be shared to reduce memory capacity needs. Memory de-duplication can reduce capacity needs that more applications or VMs to run on the same machine. Additionally, the efficient sharing afforded by data de-duplication can enable more effective use of caches and reduce the energy required in maintaining multiple copies of shareable memory. However, current software approaches to sharing typically create software overhead and are inefficient.

It is with respect to these and other considerations that the present improvements have been needed.

DETAILED DESCRIPTION

Various embodiments may be generally related to data de-duplication in devices and systems including non-volatile storage devices and memory subsystems that may include both volatile and non-volatile storage. Some embodiments entail the use of data de-duplication for data in random access memory devices including flash memory, such as not-AND (NAND) flash memory, phase change random access memory (PRAM), dynamic random access memory (DRAM), magnetic random access memory (MRAM), and the like.

In particular embodiments data de-duplication may be performed in memory subsystems that are used to provide virtual machines, applications, and/or processes in which memory copies may be created, which are shared to reduce storage capacity requirements. In some embodiments, data de-duplication may be performed to reduce redundant copies of data in storage devices, such as a non-volatile random access memory.

Various embodiments include an apparatus that comprises a non-volatile random access memory to store first data, a processor, and a data de-duplication module that is operable to read a signature of incoming data to be written to the apparatus, compare the signature to first data in the solid state memory and flag the incoming data for discard if the signature indicates a match to the first data. In various embodiments, the signature may be a hash or an error correcting code that may be applied to the incoming data. In some embodiments the random access memory may be a non-volatile memory, such as a flash NAND device or a PRAM device.

In various embodiments, de-duplication of data is performed when incoming data is received by a device (or apparatus) as the data enters the device in real time. In various embodiments, de-duplication may be implemented using processor, such as a system processor or, alternatively, using a controller, such as a solid state device (SSD) controller.

If a device determines that a block of incoming data is already stored in a memory, the device may create a reference, or pointer, that references to the existing data block without storing the incoming data. In this manner, duplicate storage of the same data can be avoided or minimized and the lifetime of non-volatile memory used to store incoming data may be extended.

Figure 1:
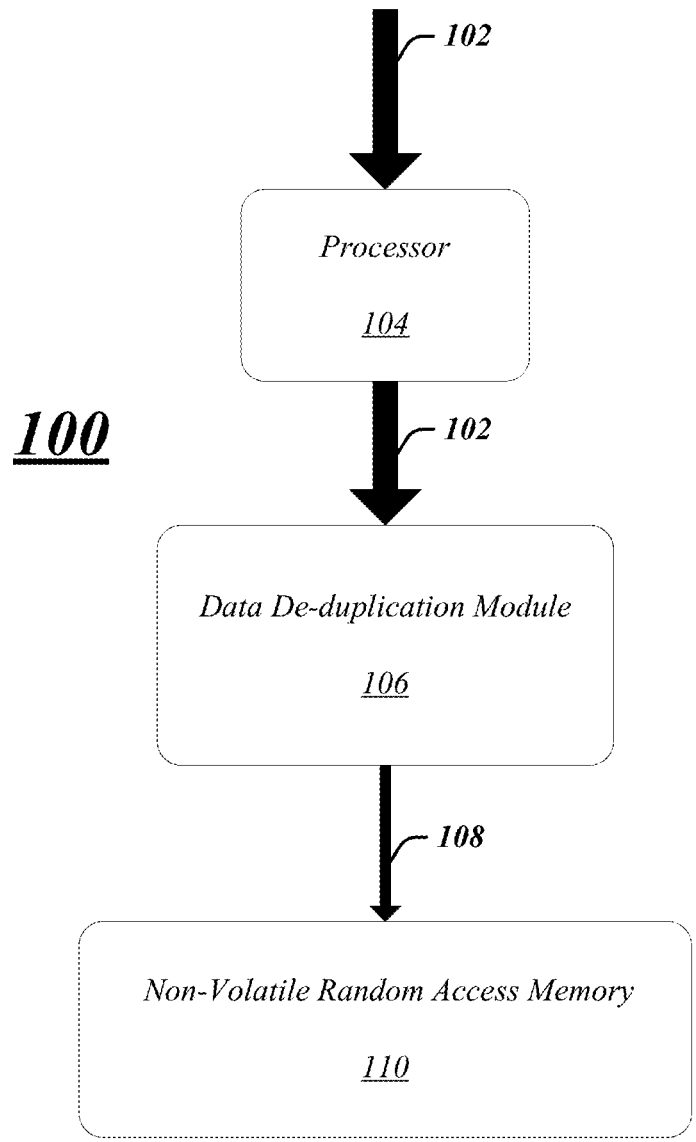
FIG. 1 depicts a system for de-duplicating incoming data.

Consistent with the present embodiments, FIG. 1 depicts operation of a system 100 for de-duplicating incoming data 102. As illustrated, a flow of data 102 may be received in the system 100, which includes a processor 104 that may direct the data 102 for processing by a data de-duplication module 106. The data 102 may represent multiple blocks of data that are received by system 100 over multiple instances in time. The data de-duplication module 106 may flag blocks of incoming data 102 for which copies of such data blocks are already present in the non-volatile random access memory 110. Accordingly, as illustrated in FIG. 1, the data 108 that is forwarded for storage in non-volatile random access memory 110 may be less than the data 102 received by system 100 over time.

In this manner, the saving of data in non-volatile random access memory 110 can be done in an efficient manner that avoids or minimizes storage of duplicate copies of the same data. Although data de-duplication processes are known, known processes have been traditionally applied to data backup systems and not to solid state memory systems or to virtual machine arrangements, as described below.

Figure 2:
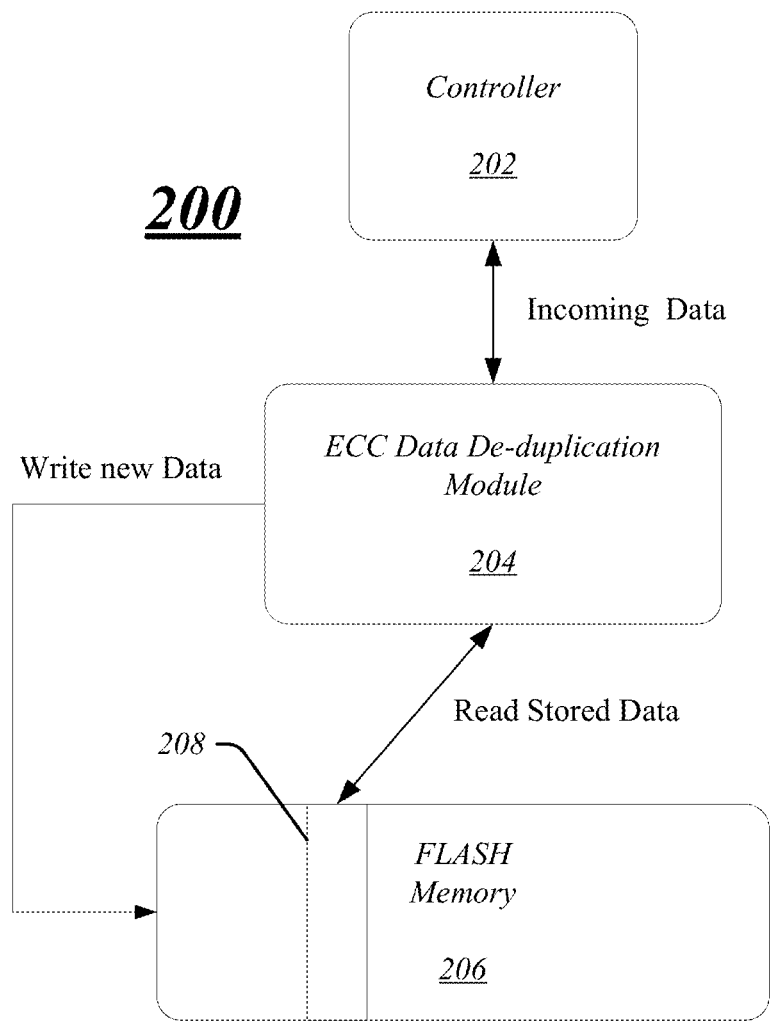
FIG. 2 depicts another embodiment of a data de-duplication system.

In various embodiments, a data de-duplication module may be implemented on hardware specific-logic. For example, in some embodiments, a system for data de-duplication may include a controller for controlling data storage in a solid state random access memory, and a data de-duplication module to read existing data stored in the solid state random access memory and to compare the existing data to incoming data to determine whether the incoming data is a duplicate of the existing data. FIG. 2 depicts an embodiment of a data de-duplication system 200 that includes a controller 202, which may be a solid state device (SSD) memory controller. In the example illustrated, the controller 202 may be used to control data storage in a flash memory 206. Controller 202 may employ data de-duplication to process incoming data to be written to the flash memory 206. For example, the incoming data may be processed by an error-correcting code (ECC) data de-duplication module (or, simply "ECC de-duplication module") 204. The ECC de-duplication module 204 may be employed to read data that is stored in flash memory 206, for example, to compare the stored data to incoming data. The ECC de-duplication module 204 may thereby determine whether a duplicate version of all or part of incoming data is present in flash memory 206.

The ECC de-duplication module 204 may be arranged such that any incoming data that is determined to be new or non-duplicate data, that is, data that is not already stored in flash memory 206, is sent to the flash memory 206 for storage, for example at a physical address 208. Any portion of incoming data that is determined to be duplicate data in which a copy of the duplicate data is already present in flash memory 206, may be flagged for discarding.

In various embodiments ECC de-duplication module 204 may perform data-de-duplication by employing ECC check bytes (this term may be used interchangeably with the term "check bits") that are conventionally used to protect against errors in storage devices, such as NAND memory. In accordance with the present embodiments, the ECC check-bytes may serve dual purposes: to perform error correction and to perform data de-duplication. This dual purpose feature may therefore facilitate data de-duplication in such devices as flash NAND and other SSD devices without incurring the need for any additional storage that would be required to accommodate SHA digests used for conventional data de-duplication, as discussed above.

As detailed below, in particular embodiments, the ECC de-duplication module 204 may employ a concatenated coding scheme to form ECC codewords. This scheme allows the ECC de-duplication module 204 to read out just the check byte portion of codewords to apply any necessary error correction, and thereby renders the ECC check-bytes as reliable de-duplication "digests." In particular, the construction of the concatenated code may be performed such that the overall error correction capability of a device is not impaired. In addition, in some embodiments the ECC de-duplication module 204 may employ the same ECC "engine" (not separately shown) for both outer-code protection, and inner-code protection.

The concatenated coding scheme thus may provide several advantages. First, the endurance of solid state NAND devices used to store data by reducing the number of program/erases cycles may be improved. This effectively extends the lifetime of such devices, since each solid state NAND device typically can operate for only a prescribed number of program/erase cycles before the NAND device degrades beyond the point of acceptable performance. Another advantage is the extra spare area that may be created by the data de-duplication, which area can be used in an SSD as the "shuffle-space" for improving the write input/output operations per second (IOPS) of the device. The data de-duplication provided by the present embodiments may also reduce power consumption due to the lower NAND device I/O power and write energy required. Moreover, the write speed of an SSD may be improved, since, for a given amount of incoming data over time, less data is written to a NAND device. This may also result in improved bus bandwidth.

Figure 3:
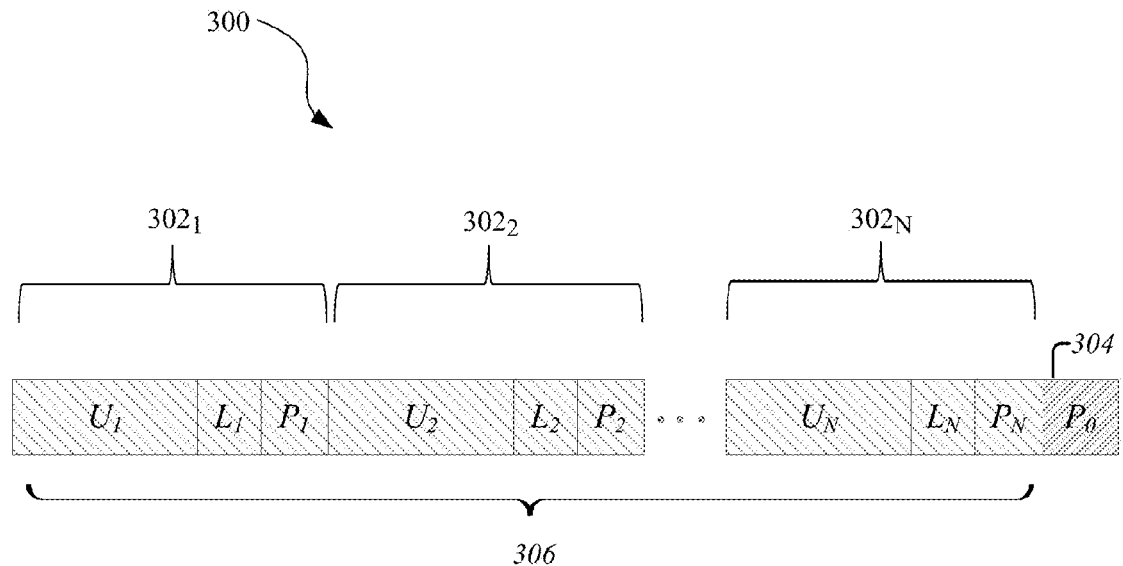
FIG. 3 and FIG. 4 depict, respectively, a conventional concatenation coding scheme and a coding scheme arranged according to the present embodiments.
Figure 4:
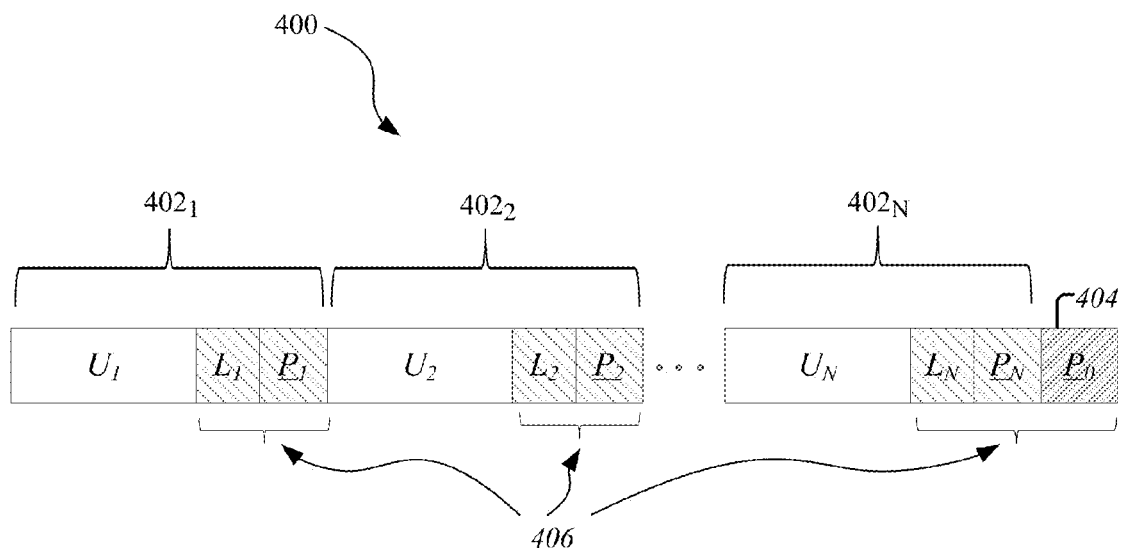

FIG. 3 and FIG. 4 depict, respectively, a conventional concatenation coding scheme and a coding scheme arranged according to the present embodiments. In particular, FIG. 3 depicts a concatenated code 300 having a conventional arrangement. Conventional concatenated codes include an inner code, which constitutes a codeword that protects the user data and logical block address (LBA) information. As illustrated, the inner code $P_i$ protects a user data component $U_i$ and logical block address component $L_i$ for each inner codeword $302_i$. The outer code $P_O$ 304 may protect components 306, which may include check bytes of multiple inner code words 302, as well as portions of user data and LBA information.

FIG. 4 depicts a codeword arrangement 400 consistent with the present embodiments. The codeword arrangement 400 facilitates a simpler scheme to protect and detect data changes. For example, using the codeword arrangement 400, only the user data check bits, which typically constitute only about 10% of a whole codeword, need to be read out. As an example, a B85NAND uses a code rate of 0.9 low density parity check (LDPC) code. As illustrated, the codeword arrangement 400 includes multiple inner codewords 402, in which each inner codeword $402_i$ includes a user data component $U_i$ and a logical block address component $L_i$, which are protected by an inner code check byte $\underline{P}i$. As detailed below, an outer code 406 may provide protection for the check bytes and the logical block address component $L_i$, so that a system can detect if user data component $U_i$ has been changed or not.

In various embodiments, inner codewords may be combined in different ways to generate a concatenated code. For example, based on the code length and page size, several code words that reside on a same page may be used to generate the outer code, thereby eliminating the need to add any extra check-bytes to a codeword.

Referring also to FIG. 3, the example shown may be used to illustrate coding of one page in memory. It may be assumed there are N code words in each page and that each inner codeword 302, includes U bits of user data plus LBA bits and P bits of ECC (parity) data. In the concatenated structure of codeword arrangement 400 illustrated in FIG. 4, user data component $U_i$ and a logical block address component $L_i$ are protected by an inner code check byte $\underline{P}i$, which may correspond to $\underline{P}$ parity check bits, where $\underline{P}<P$. The combination of $U_i$, $L_i$, and $\underline{P}i$ create the inner code or codeword $402_i$. The concatenated structure of codeword arrangement 400 further encodes all the parity check bits, $P_1$ to $P_N$ and the LBA bits $L_1$ to $L_N$ with $P_0$ parity check bits 404 to form the outer code 406. In the present embodiments, the outer code 406 may be systematic, which means that the input data is embedded in the encoded output, so that inner code decoding can be carried out without outer code decoding. In various embodiments the outer code of a concatenated codeword arrangement may be similar or identical to the inner code so that both may be operated upon using the same codec hardware.

It is to be noted that the codeword arrangement 400 of FIG. 4 can provide sufficiently low error rate for reliable use in SSDs. To illustrate this, the probability of unique data having the same ECC check bits can be calculated as $(1-P_{oerr})/2^P$, where $P_{oerr}$ is the error rate of the outer code 406. In an example of B85 NAND, P is equal to 935, which means that the chance that unique user incoming data has the same ECC check bits as existing data, is about $10^{-282}$. This probability is much lower than the required error rate in SSDs and hence shows that such concatenated coding as illustrated in FIG. 4 can be reliably used.

In accordance with some embodiments, data de-duplication may be performed as follows. A generator matrix [G] may be used to produce a parity $P_1$ for an inner codeword that contains $U_1$ data bits and $L_1$ LBA bits. The generator matrix [G] may be a generator matrix of Bose-Chaudhuri-Hocquenghem (BCH) or low density parity check (LDPC), or other linear code. The matrix of data bits and LBA bits may be multiplied by the generator matrix to yield the parity according to $$[U_1, L_1] \times [G] = [P_1] \quad (1).$$

The matrix of data bits may be multiplied by the generator matrix according to $$[U_1, 0] \times [G] = [P_1'] \quad (2),$$

while the matrix of LBA bits may be multiplied by the generator matrix according to $$[0, L_1] \times [G] = [P_1''] \quad (3).$$

Since all of the above Eqs. (1) to (3) are linear, it can be shown that $$[P_1] = [P_1'] \text{exor} [P_1''] \quad (4), \text{ or}$$

$$[P_1'] = [P_1] \text{exor} [P_1''] \quad (5).$$

In the present embodiments, during a de-duplication process, a data de-duplication module may read the outer code of previously stored data in a memory, from which P and L may be extracted. After extracting L and P, the inner parity bits constituting the data parity matrix $[P_1']$ can be calculated according to Eqs. (3), (4), and (5). The parity of incoming data can then be computed and compared to $[P_1']$. If the two parities match, the data de-duplication module may determine that a duplicate set of data has been found corresponding to the pre-existing data. The data de-duplication module may repeat the search process for other duplicates over a large set of values by computing the inner parity bits for other pre-existing data as shown above. In some embodiments, these values may reside in a cache and, during any write process for incoming data, the cached values may be checked against parity values of the incoming data sectors.

Another advantage of the concatenated coding arrangement of the present embodiments is the additional layer of ECC protection provided through an iterative decoding mechanism. During a read operation, if the inner code has an error rate of $P_{ierr}$, the probability of triggering the outer code decoding is only equal to $P_{ierr}$. Considering possible scenarios when the outer code is triggered, the chance that only one out of N codewords fails can be expressed as $N P_{ierr}$; the chance of two out of N code words failing is $(N(N-1)/2) P_{ierr}^2$; the chance of three out of N codewords failing is $(N(N-1)(N-2)/6) P_{ierr}^3$, and so forth. Therefore, when outer code decoding is triggered during a read operation, only a small portion of data need be corrected most of the time, since multiple inner codes have a very low probability of failing at the same time. After the outer code is used to correct any errors, the data can be further decoded using the inner codes again, with the additional information that some of the bits are already corrected. For example, using the LDPC class of error correction codes, the soft information for those correct bits we can be set to the maximum magnitude. Hence, the size of P can be adjusted to reduce the probability of carrying out outer decoding during a read to minimize the overhead.

Figure 5:
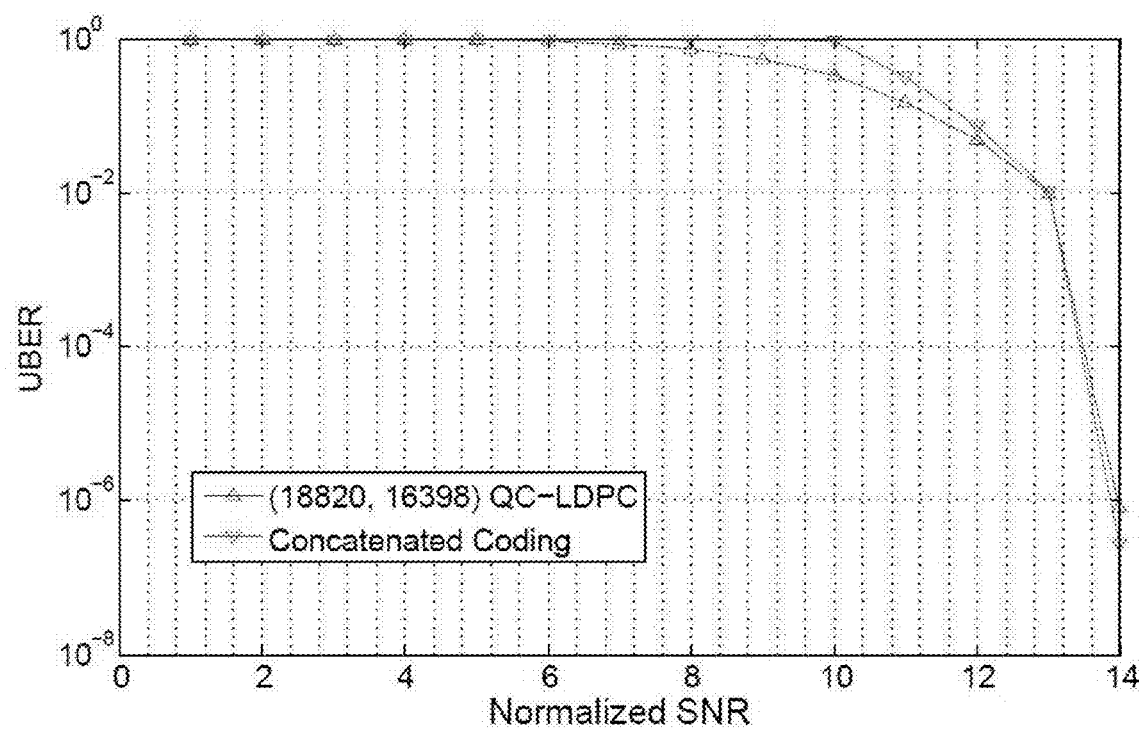
FIG. 5 depicts error rate as a function of signal to noise ratio for a conventional coding scheme and for a coding scheme arranged according to the present embodiments.

The efficacy of the concatenated coding scheme afforded by the present embodiments can be verified by comparison to a known non-concatenated coding scheme, as illustrated in FIG. 5, which depicts error rate as a function of signal to noise ratio. The non-concatenated coding scheme is based upon a quasi cyclic LDPC code. With the same number of check bytes in both schemes, the concatenated coding scheme of the present embodiments achieves almost the same error correction strength as with conventional (non-concatenated) ECC.

In other embodiments, in which only the parity check bits of inner codes are encoded for outer code, some performance may be lost, but this can be compensated for by adding only a small number of check bytes. Alternatively more data may be encoded into the outer code for better correction capability, which may entail a readout of more data to decode the outer code, the latter of which is generally needed for detection of duplicated data.

In various other embodiments, de-duplication of data may be performed on the basis of a logical block address. In particular, data that is previously stored in a specific LBA is checked against new incoming data to be stored to that LBA only. If the incoming data meant for the specific LBA matches the previously stored data for the same LBA, the data de-duplication module may alert the system to ignore the incoming data; otherwise, the data de-duplication module may direct the system to write the incoming data to the storage device, such as a NAND. In this embodiment, a match between previously stored and incoming data can be determined by reading the outer code of the stored concatenated code, computing [P1'], and comparing the computed [P1'] with check bits generated by an ECC engine for the specific corresponding LBA data. If the check bits match the computed [P1'], a data de-duplication module may determine that duplicate data is being received, which therefore does not need to be written to the NAND. If no match is found, then it may be determined that the host has written new data, which is to be written to the NAND.

Included herein is a set of flow charts representative of exemplary methodologies for performing novel aspects of the disclosed communications architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
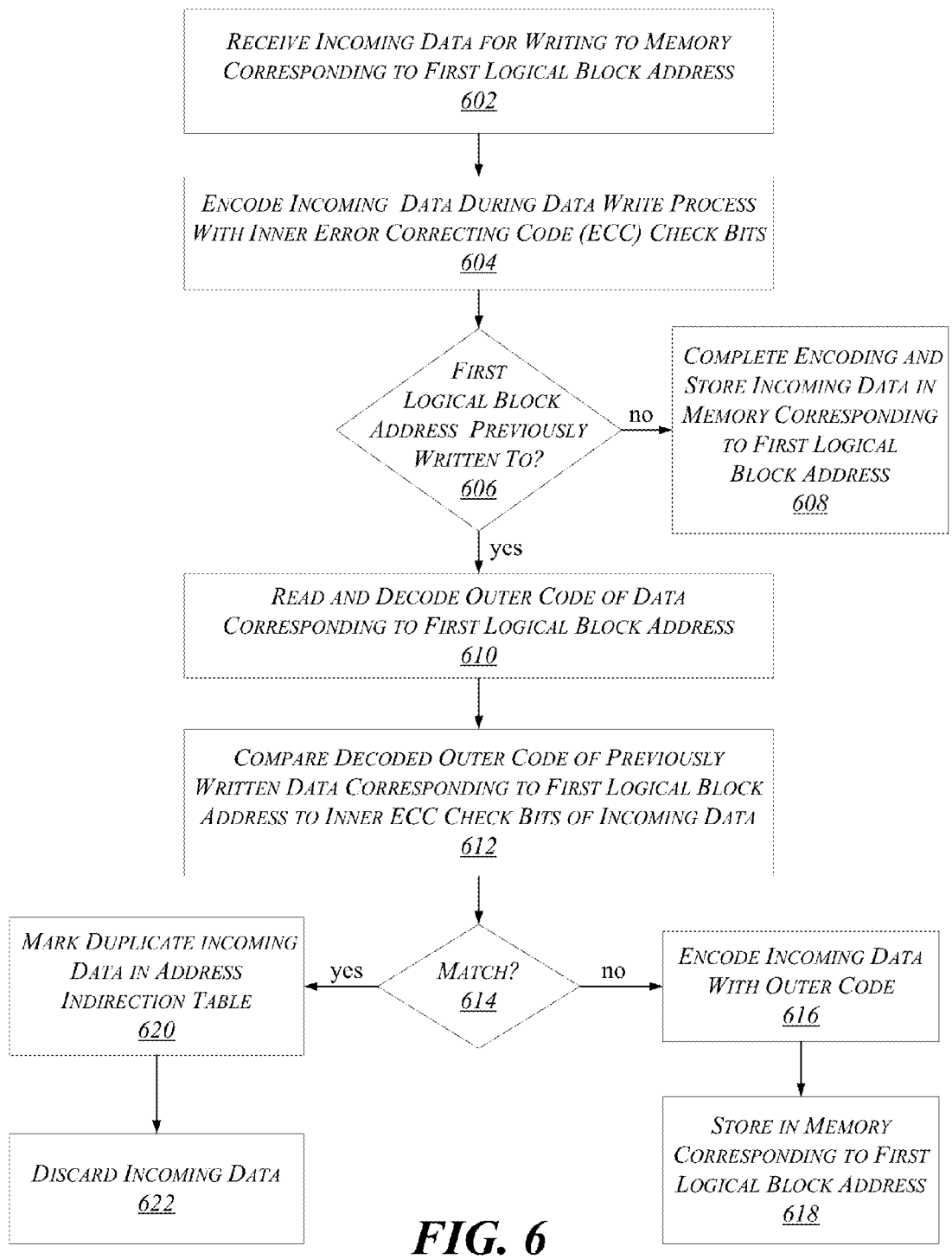
FIG. 6 depicts an exemplary logic flow.

FIG. 6 depicts a logic flow 600. At block 602, incoming data to be written to a portion of memory corresponding to a first LBA. At block 604, the incoming data is encoded during the write process with error correcting code (ECC) check bits to form the inner code of a concatenated codeword. At block 606, a determination is made as to whether data has been previously written to the first LBA. If the first LBA has not been written to, the flow proceeds to block 608. At block 608, the write process is completed by completing the encoding of the concatenated codeword. The outer code is encoded for the data and inner code previously created, and the concatenated codeword is stored in the memory location corresponding to the first LBA.

If, at block 606, it is determined that the LBA has been previously written to, the flow proceeds to block 610. At block 610, the outer code of previously stored data corresponding to the first LBA is read and decoded. At block 612, the outer code of the previously written data of the first LBA is compared to the inner ECC check bits encoded for the incoming data.

At block 614, it is determined whether the outer code of the previously written data of the first LBA matches the inner ECC check bits encoded for the incoming data. If no match is found, the flow proceeds to block 616. At block 616, the incoming data is encoded with outer code to form a concatenated code. The flow then proceeds to block 618, where the concatenated code containing the incoming data is stored to memory corresponding to the first LBA.

If, at block 614, a match is found, the flow proceeds to block 620. At block 620, a record indicating the incoming (duplicate) data is marked in an address indirection table. At block 622, the incoming data is not stored and may be discarded.

Figure 7:
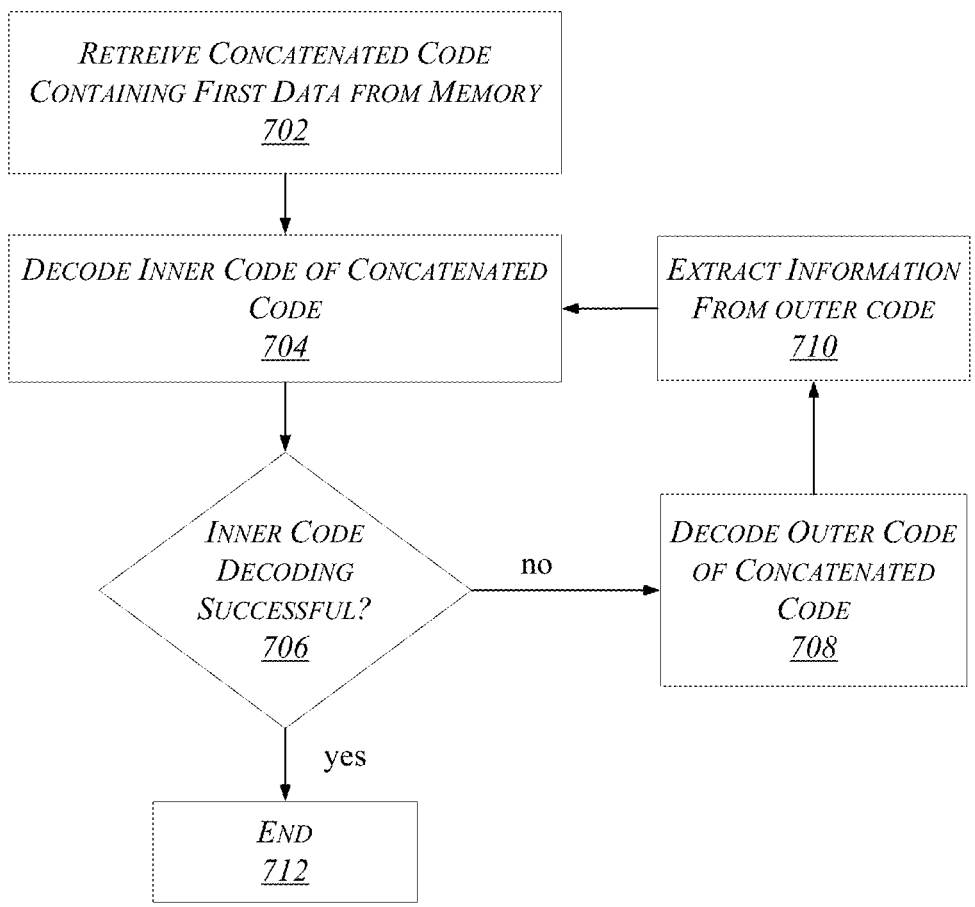
FIG. 7 depicts another exemplary logic flow.

FIG. 7 depicts another exemplary logic flow 700. In various embodiments, the logic flow 700 may be used in conjunction with the LBA de-duplication process, as described above with respect to FIG. 6. At block 702, concatenated code containing first data is retrieved from a first memory. At block 704, the inner code of the concatenated code is decoded. At block 706, a determination is made as to whether decoding was successful. If the inner code decoding is successful, that is, if there are no fatal errors encountered during the decoding, the flow proceeds to block 712, where the logic flow ends. If the inner code decode is not successful, the flow proceeds to block 708 where the outer code of concatenated code word is decoded. The flow then proceeds to block 710, where information is extracted from the outer codeword. In the process, some bits of the previously failing inner code may be corrected. The flow then returns to block 704, where the inner code is decoded again. The logic flow through a loop comprising blocks 706, 708, 710, and 704 until the inner decoding is successful.

In further embodiments, data de-duplication may be performed to facilitate use of non-volatile memory (NVM) in memory subsystems. In particular, in some embodiments, a two-level memory architecture may be employed to incorporate NVM based memory, such as PCMS, into the memory subsystem. The two level NVM-based memory architecture may provide a convenient mechanism to enable fine-granularity sharing of memory without software involvement. Such hardware-controlled sharing is enabled primarily due to the need to re-map a software generated system memory address to a NVM block address. During such re-mapping, it is possible to point two or more system memory addresses to the same NVM block address. This can be done when the data contents of two or more blocks are identical, thereby eliminating the need to store both blocks in the system memory.

In various embodiments a system for data de-duplication may have a two-level memory architecture that includes a DRAM-based memory-side cache and a PCMS-based non-volatile memory. The system may include an address indirection table (AIT) used in two-level memory architecture and a mechanism, such as a hashing mechanism, to create pointers from data content of a data block. The system may further include a copy-on-write mechanism to "un-duplicate" blocks that are to be unshared.

Figure 8:
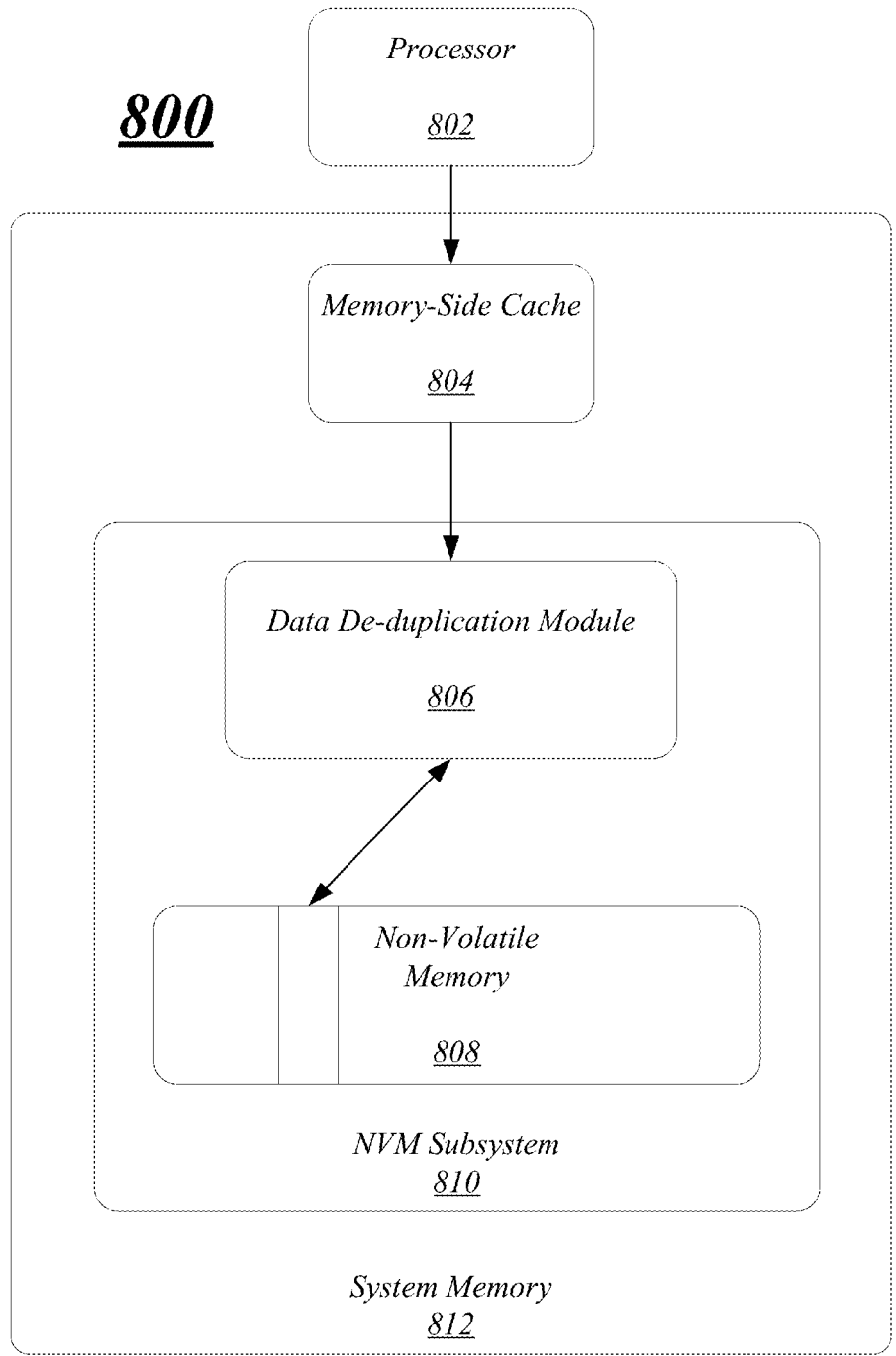
FIG. 8 depicts an exemplary architecture for a system for data de-duplication.

FIG. 8 depicts an architecture for a system 800 for data de-duplication that employs such a two-level NVM-based memory subsystem consistent with various embodiments. The system 800 includes a processor 802 that is coupled to a memory-side cache 804. The system 800 also includes an NVM subsystem 810 that includes a data de-duplication module 806 and non-volatile memory 808. In some embodiments, the processor 802, memory-side cache 804, and data de-duplication module 806 may form part of a controller (not shown) that controls the read/write operations of non-volatile memory 808.

In operation, the system 800 may perform in the following manner. The memory-side-cache 804 and non-volatile memory 808 may together form system memory 812 that can hold programs and data currently being used by a device, such as a computing device. During read/write operations in system 800, a controller that is performing any read/write access to system memory may first look up the memory-side-cache 804 using a System Memory Address generated by software. If the memory-side-cache 804 does not have a specific memory page (or "page") being accessed, the access is routed to the NVM subsystem 810. In this subsystem, the System Memory Address is first re-mapped to an NVM Physical Address using data de-duplication module 806, which may contain a table, such as an address indirection table, as detailed below. Such a table may be useful since the actual location that a System Memory Address points to in physical space may change over time due to operations such as wear leveling and bad block management. In accordance with the architecture and procedures set forth below, a data de-duplication module, such as data de-duplication module 806, may then determine whether data being written/read is previously stored in the non-volatile memory, such as non-volatile memory 808. As a result, if incoming data to be written to memory is determined to be already stored in the non-volatile memory 808, the system 800 may determine not to write the incoming (duplicate) data to the non-volatile memory.

Figure 9:
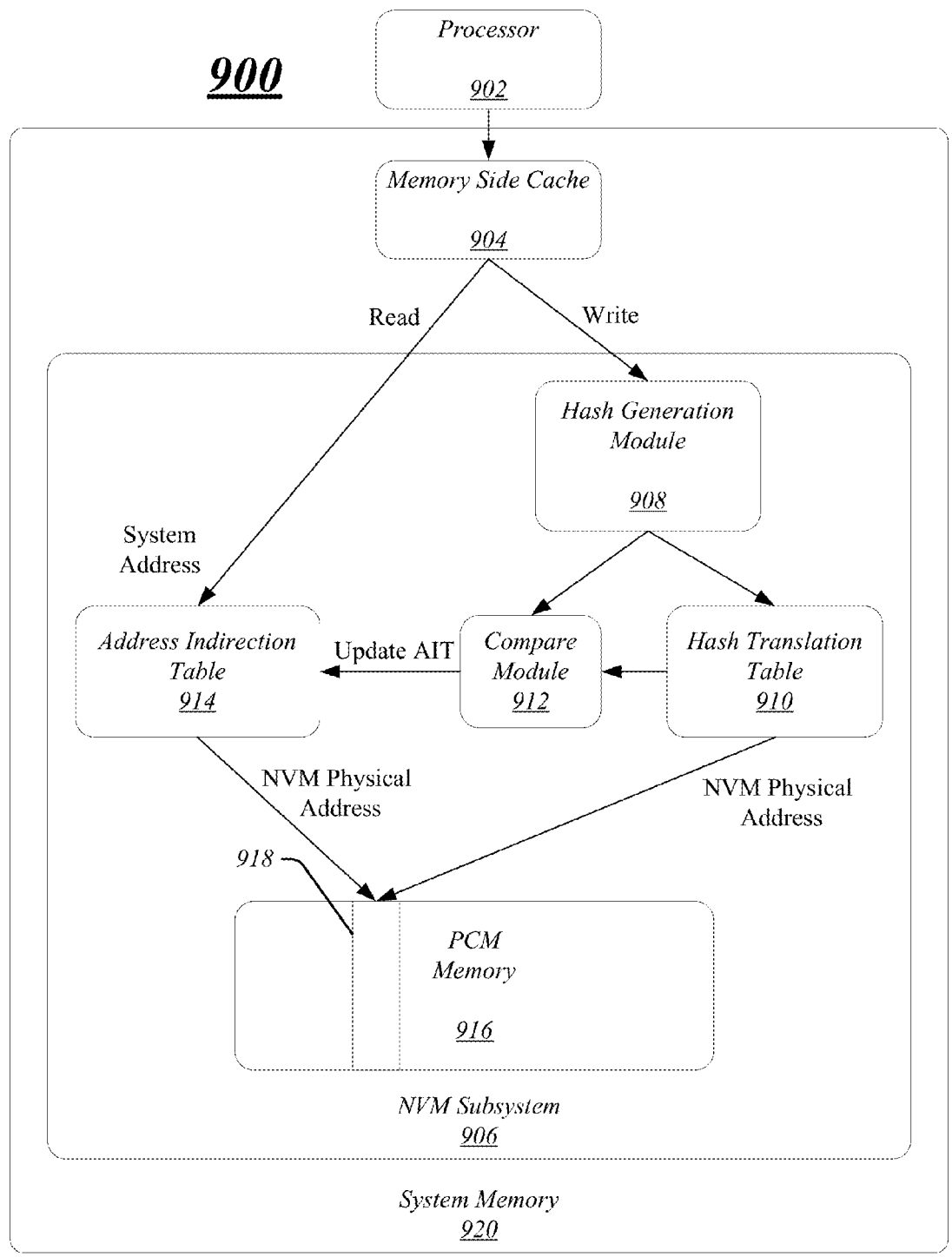
FIG. 9 depicts another exemplary architecture of a system for data de-duplication use in a non-volatile memory access path.

FIG. 9 depicts an architecture of a system 900 for data de-duplication consistent with additional embodiments. The system 900 may include a processor 902, memory-side-cache 904, and an NVM subsystem 906. In operation, the system 900 may perform similarly to system 800, such that during read/write operations in system memory 920, a look-up is first performed by accessing the memory-side-cache 904 using a System Memory Address generated by software. The access may be routed to NVM subsystem 906 when the page being accessed is not contained in the memory-side-cache 904. System 900 may then perform a data de-duplication process in NVM sub-system 906 to determine whether, for example, incoming data being written to the system memory 920 is already contained in the NVM sub-system 906. The NVM sub-system further includes a hash generation module 908, hash translation table 910, compare module 912, address indirection table (AIT) 914 (which components may collectively form a data de-duplication module in some embodiments), and PCM memory 916, whose operation is detailed below.

During a write operation, when a Write Access is forwarded to the NVM subsystem 906 after it is determined that the page being accessed is not present in the memory-side-cache 904, the contents of the write may be sent through a hashing function to produce a hash that has any bits needed to address all of the NVM physical memory (memory in the PCM) along with a key to uniquely identify the data. For example, hash generation module 908 may produce a hash of the incoming data, and use the hash to generate a Hashed System Address (HSA). The hash generation module 908 may map the HSA to an NVM Physical Address (NVMPA). The hash generation module 908 may also create a "hash translation table" (HTT), such as HTT 910, which may include a set of HSAs that are mapped to respective NVMPAs for multiple different blocks of data written to the PCM memory 916. The HTT may also include data keys for uniquely identifying each block of data. In one embodiment of HTT 910, a given block of data may be mapped to multiple parameters including: 1) an HSA corresponding to a hash generated from the block of data; 2) an NVMPA that identifies the physical location of the block of data; and 3) a data key to uniquely identify the block of data.

During the write operation, the NVMPA may be entered into the AIT 914 for the System Memory Address for the original write operation. In a current write operation, the System Memory Address is first re-mapped to an NVM physical address using AIT 914, which may be maintained by hardware. The AIT 914 may be useful to account for changes in the actual location in physical space that a System Memory Address points to, which address may change over time due to operations such as wear leveling and bad block management.

After an NVMPA for the data to be written is entered in the AIT 914, the write process may proceed to the PCM memory 916, using the entered NVMPA. For example, the data may be written to physical address 918 in PCM memory 916.

Subsequently, after the first write process, the system 900 may conduct a second write process for a second set of data to a different System Memory Address in NVM subsystem 906. The second set of data may be processed through hash generation module 908 to produce a second hash and second data key. The compare module 912 may then compare the second hash to hash(es) stored in HTT 910. If the second hash is the same as a hash for data stored in PCM memory 916, such as the hash for data stored in physical address 918, and the second data key matches that of the data stored in physical address 918, the system 900 may flag the incoming data as duplicate data. In other words, the system 900 may determine that data is already present in the PCM memory 916 that duplicates the second data being written. The system 900 may therefore determine that the second data is to be associated with the same NVM physical address as that storing the first data. The NVMPA to be assigned the second data may be derived from the entries in HTT 910 for the first data, and may be entered in a record for the second data into the AIT 914.

If the data key or hash generated for the second data by hash generation module 908 does not match any entry in the HTT 910, system 900 may create a different NVM physical address in the NVM subsystem 906 to store the second data. In the above manner, after all of memory is written through a series of write operations, the HTT 910 and AIT 914 may be filled. Depending on the amount of data sharing created by the above data de-duplication process, multiple AIT entries in AIT 914 may point to the same NVM physical address, for one or more NVMPAs in the PCM memory 916.

Consistent with further embodiments, during a data read operation, data may be read by first accessing the memory-side cache 904. Any read access that misses in the memory-side-cache 904 may trigger a lookup process in the AIT 914 using the System Memory Address. This lookup process may then yield the NVM physical address used to lookup the PCM memory. In some embodiments, multiple reads from different applications may point to the same NVM physical address as previously explained.

Figure 10:
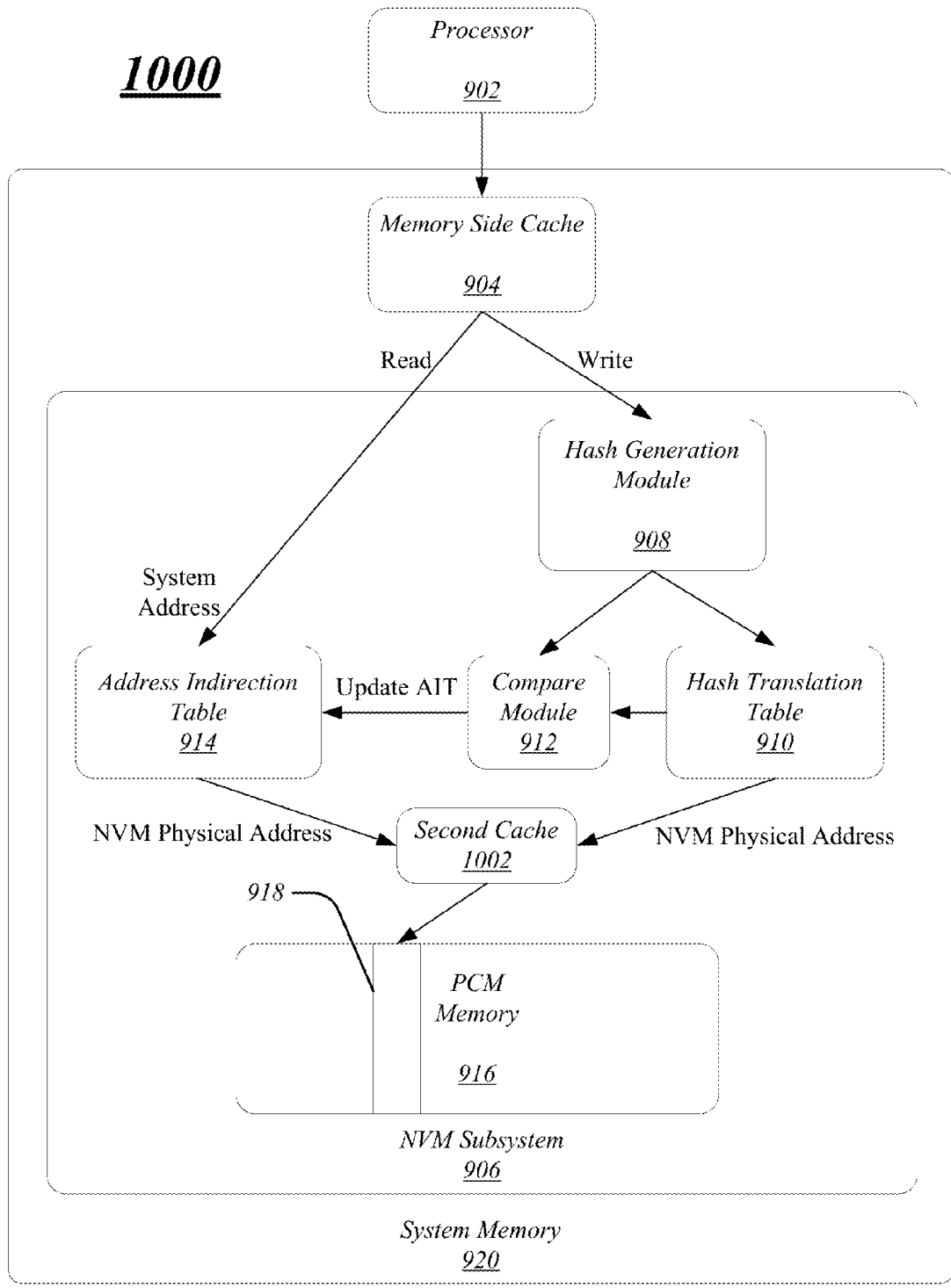
FIG. 10 depicts a variant of the embodiment of FIG. 9.

FIG. 10 depicts a variant of the embodiment of FIG. 9 in which an additional cache is used between the PCM memory and the hash translation table and address indirection table. The system 1000 includes similar components as system 900 with the addition of a second cache 1002 that is disposed between the PCM memory 916 and the HTT 910 and AIT 914. The second cache 1002 may act to cache the de-duplicated data after incoming data is de-duplicated by the 908-914. Such a cache may operate in an extremely efficient manner since it may keep a single copy of data for all shared content.

Figure 11:
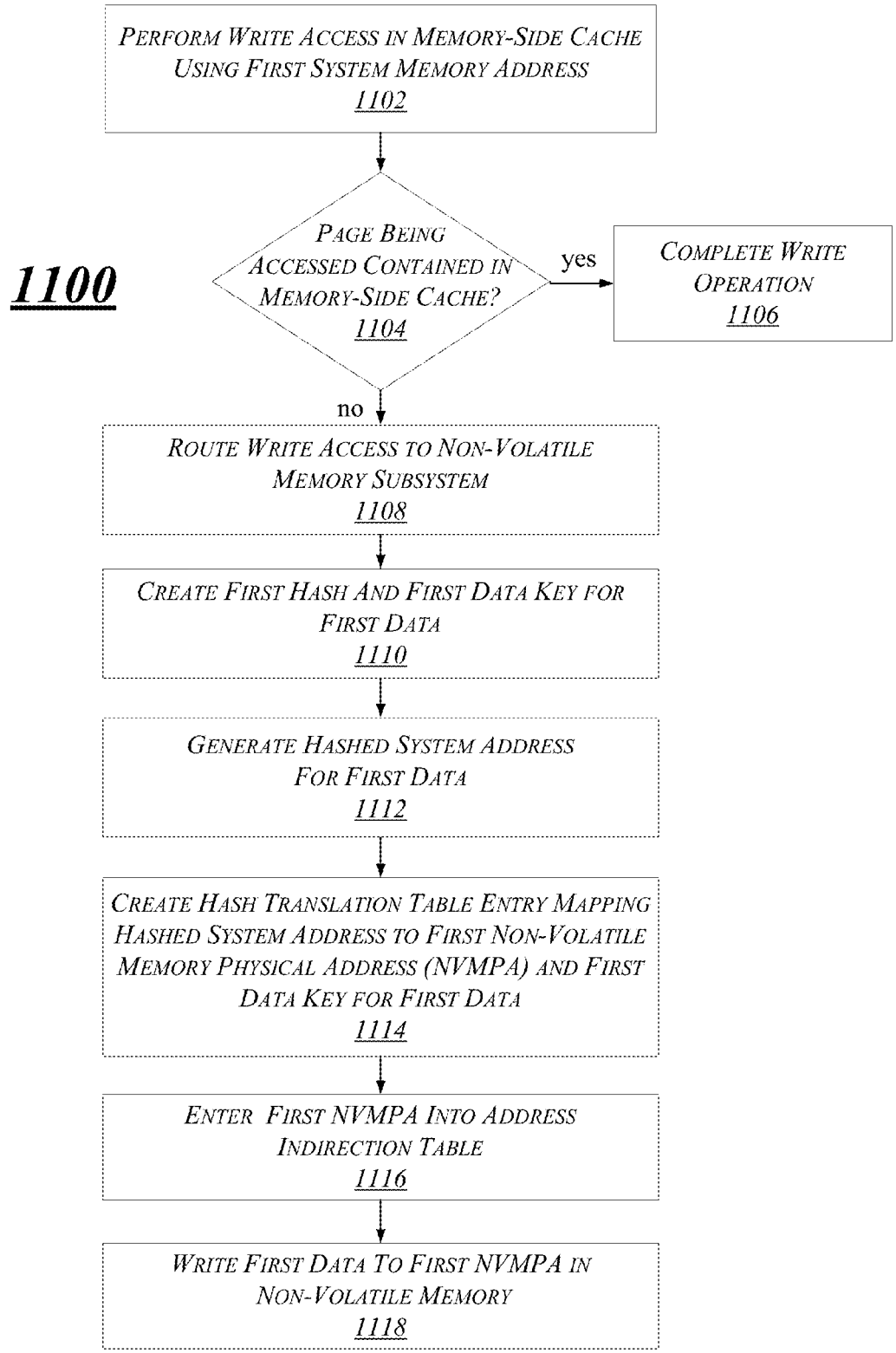
FIG. 11 depicts another exemplary logic flow.

FIG. 11 depicts another logic flow 1100. At block 1102, a write access is performed in memory-side-cache using a System Memory Address. At block 1104, it is determined whether a page being accessed is located in the memory-side-cache. If the page is located in the memory-side-cache, the flow moves to block 1106, where a write operation is completed in the memory-side-cache.

If the page being accessed is not located in the memory-side-cache, the flow moves to block 1108, where access is routed to a non-volatile memory subsystem.

At block 1110, a first hash and first data key is created for first data. At block 1112, a hashed system address is created for the first data. At block 1114, a hash translation table entry is created that maps the hashed system address to a first non-volatile memory physical address and first data key for the first data. At block 1116, the first non-volatile memory physical address is entered into an address indirection table. At block 118, the first data is written to the first non-volatile memory physical address in a non-volatile memory.

Figure 12:
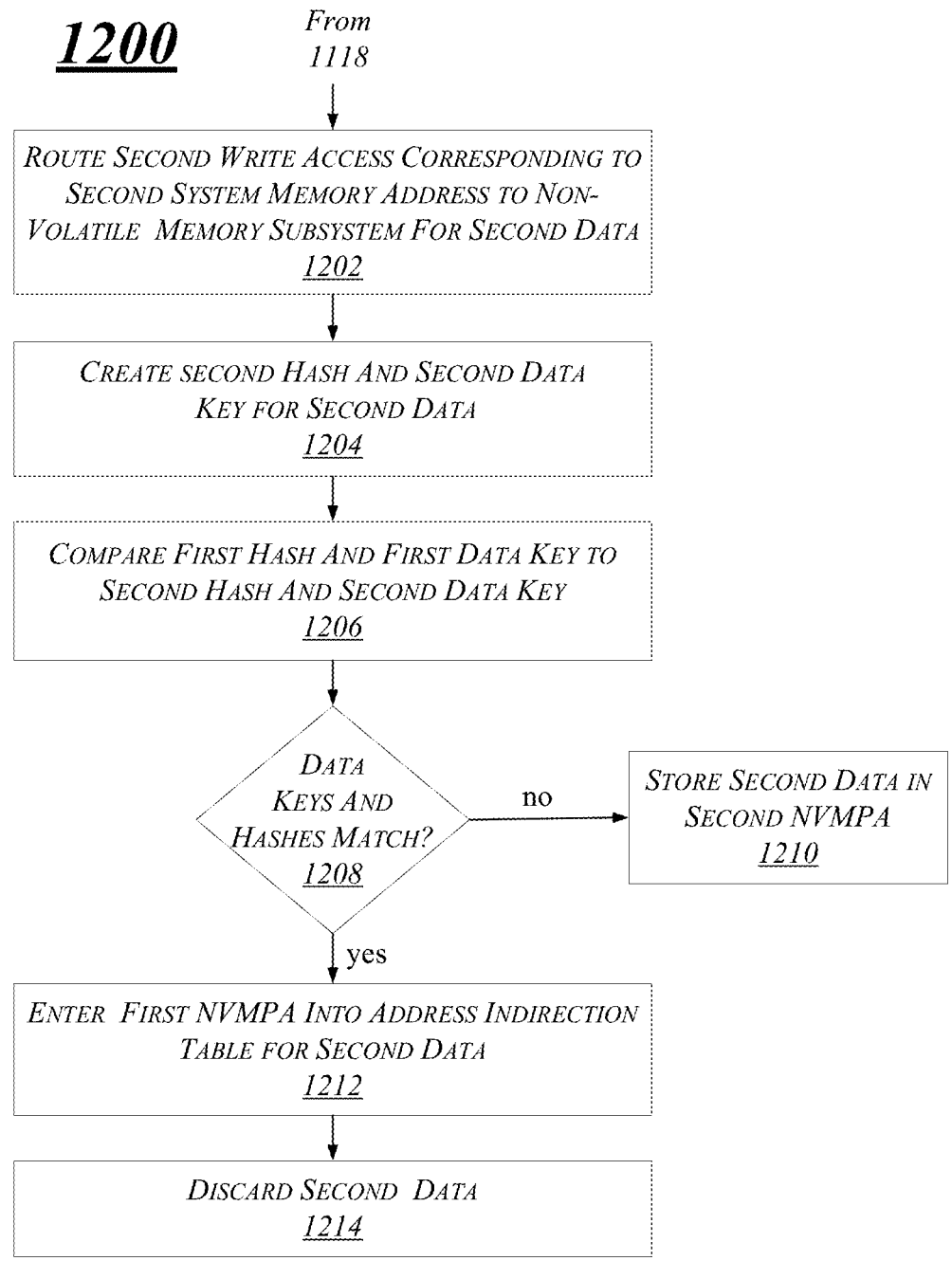
FIG. 12 depicts a further exemplary logic flow.

FIG. 12 depicts a further logic flow 1200. As illustrated, the block 1202 may take place subsequent to the block 1118 of FIG. 11. At block 1202, a second write access for second data is routed to a non-volatile memory subsystem. This routing may take place upon determination that the page being accessed in the second write access does not reside in memory-side-cache.

At block 1204, a second hash and second data key are created for the second data. At block 1206, the second hash and second data key are compared to respective first hash and first data key corresponding to first data already stored in the non-volatile memory subsystem. At block 1208, a determination is made as to whether the first hash matches the second hash and first data key matches the second data key. If the hashes and data keys do not match, the flow moves to block 1210, where the second data is stored in a second non-volatile memory physical address.

If the hashes and data keys do match, the flow moves to block 1212. At block 1212, a first non-volatile memory physical address corresponding to the location of the first data is entered into an address indirection table for the second data. At block 1214, the second data is discarded.

Referring once more to FIG. 8, in further embodiments of the system 800, the data de-duplication module 806 of the NVM subsystem 810 may employ other methods to determine that incoming data represents a duplicate of data already stored in non-volatile memory 808. For example, the data de-duplication module 806 may perform generally according to the procedures of ECC de-duplication module 204 in which error correcting code is employed to detect duplications. If the ECC data de-duplication module identifies incoming second data as a duplicate of first data already stored in a PCM, for example, a non-volatile memory physical address corresponding to the location of the first data may be entered into an address indirection table for the second data. Subsequently, the second data may be discarded.

Figure 13:
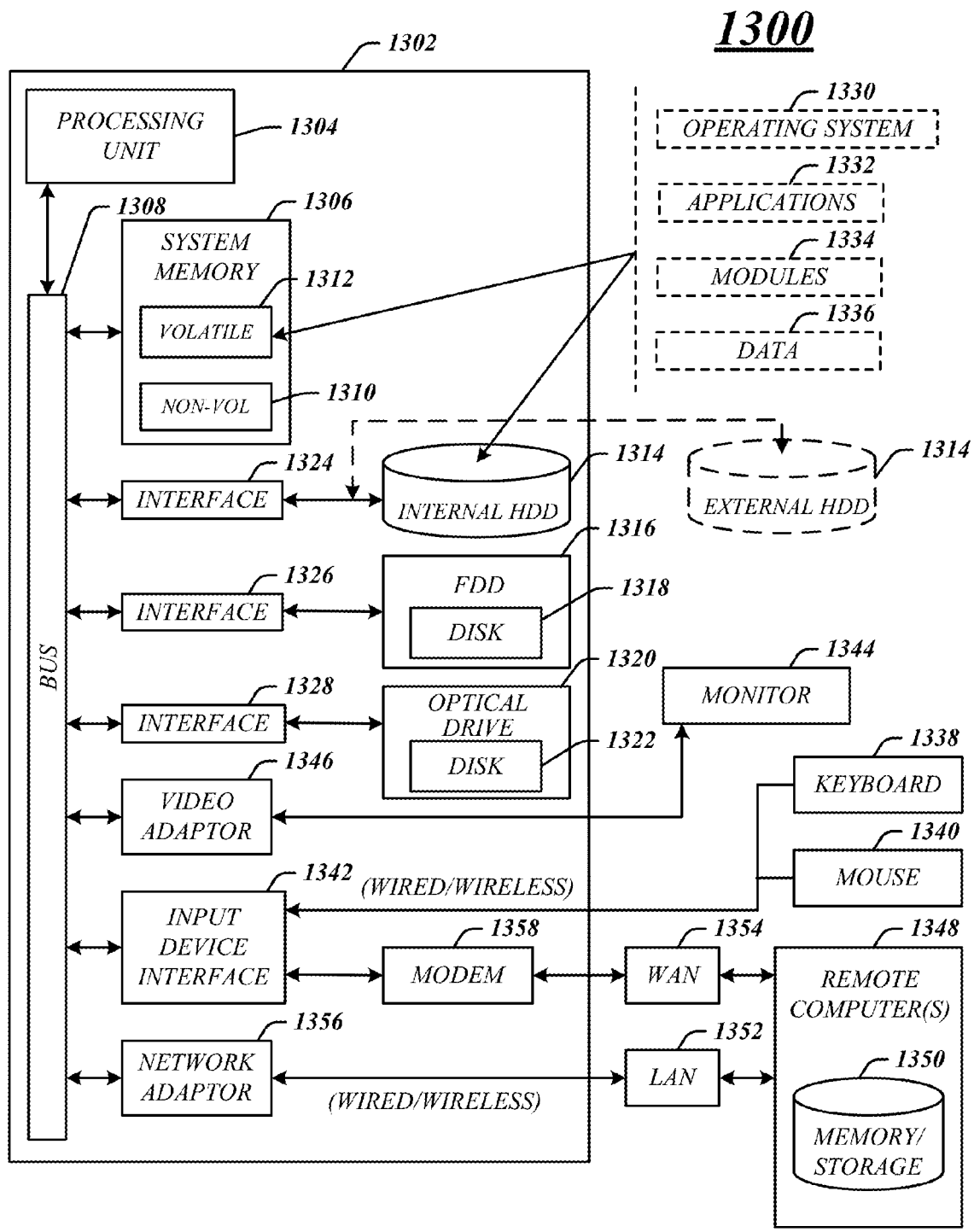
FIG. 13 illustrates an embodiment of an exemplary computing architecture.

FIG. 13 illustrates an embodiment of an exemplary computing architecture 1400 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include a non-volatile memory port and at least one or both of Universal Serial Bus (USB) and IEEE 1494 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1494 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives.

These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a non-volatile random access memory to store data;
a processor coupled to the non-volatile random access memory; and
a data de-duplication module operable on the processor to:
read a signature of incoming data;
compare the signature to first data in the non-volatile random access memory, the data de-duplication module to also include:
a hash generation module operable to produce a first hash that includes pointers to all portions of the first data stored in the non-volatile random access memory, and a first data key to uniquely identify the first data;
a hash translation table generator operable to generate a first hashed system address corresponding to a first system memory address for the first data, and to map the first hashed system address and first data key to a first physical address containing the first data in the non-volatile random access memory; and
a comparison module operable to compare a second hash and second data key of the incoming data with the first hash and first data key; and
flag the incoming data for discard when the signature indicates a match to the first data based on the comparison of the second hash and second data key with the first hash and first data key.

2. The apparatus of claim 1, comprising a two-level memory that includes the non-volatile random access memory and a memory-side-cache.

3. The apparatus of claim 2, the processor arranged to perform a lookup in the memory-side-cache when performing a read/write access of data stored in the two-level memory, and to access the non-volatile random access memory when the lookup indicates that the memory-side-cache does not contain the stored data.

4. The apparatus of claim 2, comprising a second cache arranged in a data path between the non-volatile random access memory and hash translation table generator to employ the physical address of the first data for indexing.

5. The apparatus of claim 2, the apparatus comprising the memory-side-cache and a second cache to cache de-duplicated data received from the data de-duplication module.

6. The apparatus of claim 1, the comparison module operable to:
forward a first signal to an address indirection table to store a second system memory address corresponding to the incoming data together with the first physical address when the second hash and second data key match the respective first hash and first data key; and
forward a second signal to store the incoming data in a second physical address in the non-volatile random access memory when the second hash and second data key do not match the respective first hash and first data key.

7. The apparatus of claim 1, comprising a digital display to present information from the first data.

8. The apparatus of claim 1, the non-volatile random access memory comprising a phase change memory array.

9. The apparatus of claim 1, the processor comprising a solid state device controller that includes the data de-duplication module.

10. A method, comprising:
reading a signature of incoming data;
comparing the signature to first data stored in a first portion of non-volatile random access memory of a two-level memory, comparing the signature to include
producing a first hash that includes pointers to all portions of the first data stored in the non-volatile random access memory and a first data key to uniquely identify the first data;
generating a first hashed system address corresponding to a first system memory address for the first data;
mapping the first hashed system address and first data key to a first physical address containing the first data in the non-volatile random access memory; and
comparing a second hash and second data key of the incoming data with the first hash and first data key;
flagging the incoming data for discard when the signature indicates a match to the first data; and forwarding the incoming data for writing to a second portion of non-volatile random access memory when the signature indicates no match to the first data.

11. The method of claim 10, comprising:
performing a lookup in a memory-side-cache of the two-level memory when performing a read/write access of stored data; and
accessing the non-volatile random access memory when the lookup indicates that the memory-side-cache does not contain the stored data.

12. The method of claim 10, comprising:
comparing the second hash and second data key to the respective first hash and first data key;
forwarding a first signal to an address indirection table to store a second system memory address corresponding to the incoming data together with the first physical address when the second hash and second data key match the respective first hash and first data key; and
forwarding a second signal to store the incoming data in a second physical address in the non-volatile random access memory when the second hash and second data key do not match the respective first hash and first data key.

13. The method of claim 10, comprising:
receiving an indication of the first physical address of the first data; and
indexing the first physical data.

14. At least one non-transitory computer-readable storage medium comprising a plurality of instructions that, when executed, cause a system to:
read a signature of incoming data;
compare the signature to first data in the non-volatile random access memory compare the signature to include the system to:
produce a first hash that includes pointers to all portions of the first data stored in the non-volatile random access memory, and a first data key to uniquely identify the first data;
generate a first hashed system address corresponding to a first system memory address for the first data, and to map the first hashed system address and first data key to a first physical address containing the first data in the non-volatile random access memory; and
compare a second hash and second data key of the incoming data with the first hash and first data key; and
flag the incoming data for discard when the signature indicates a match to the first data.

15. The at least one non-transitory computer-readable storage medium of claim 14, comprising instructions that, when executed, cause a system to perform a lookup in a memory-side-cache when performing a read/write access of data stored in a two-level memory, and to access the non-volatile random access memory when the lookup indicates that the memory-side-cache does not contain the stored data.

16. The at least one non-transitory computer-readable storage medium of claim 14, comprising instructions that, when executed, cause a system to:
forward a first signal to an address indirection table to store a second system memory address corresponding to the incoming data together with the first physical address when the second hash and second data key match the respective first hash and first data key; and
forward a second signal to store the incoming data in a second physical address in the non-volatile random access memory when the second hash and second data key do not match the respective first hash and first data key.

17. An apparatus, comprising:
a non-volatile random access memory to store data;
a processor coupled to the non-volatile random access memory; and
a data de-duplication module operable on the processor to:
read a signature of incoming data;
compare the signature to first data in the non-volatile random access memory, the comparison of the signature to include the data de-duplication module operable to:
read an outer code of the first data to determine a first parity; and
compute a second parity of the incoming data; and
flag the incoming data for discarding when the computed second parity matches the first parity.

18. The apparatus of claim 17, the data de-duplication module operable on the controller to:
generate parity $P_1'$ for user data $U_1$ of a first inner codeword of the first data, the first inner codeword comprising user data $U_i$, logical block address (LBA) information $L_i$ corresponding to the user data $U_1$, and computed parity of the user data $U_1$ and LBA; and
compare $P_1'$ to the computed second parity.

19. The apparatus of claim 17, the data de-duplication module operable on the controller to:
form a concatenated codeword for the incoming data by encoding an outer code for the incoming data when inner error correction coding check bits for the incoming data do not match the outer code for the incoming data;
write the concatenated codeword to the memory; and
read the concatenated codeword from the memory.

20. At least one non-transitory computer-readable storage medium comprising a plurality of instructions that, when executed, cause a system to:
read a signature of incoming data;
compare the signature to first data in the non-volatile random access memory, compare the signature to include the system to:
read an outer code of the first data to determine a first parity; and
compute parity of the incoming data; and
flag the incoming data for discarding when the computed parity matches the first parity.

21. The at least one non-transitory computer-readable storage medium of claim 20, comprising instructions that, when executed, cause a system to:
generate parity $P_1'$ for user data $U_1$ of a first inner codeword of the first data, the first inner codeword comprising user data $U_1$, logical block address (LBA) information $L_i$ corresponding to the user data $U_1$, and computed parity of the user data $U_1$ and LBA; and
compare $P_1'$ to the computed second parity.

22. The at least one non-transitory computer-readable storage medium of claim 20, comprising instructions that, when executed, cause a system to:
form a concatenated codeword for the incoming data by encoding an outer code for the incoming data when inner error correction coding check bits for the incoming data do not match the outer code of the incoming data;
write the concatenated codeword to the memory; and
read the concatenated codeword from the memory.

* * * * *